March 5, 1968     S. L. SPERANZA, JR     3,371,895

VIBRATION-DAMPING AND LOAD-SUPPORTING APPARATUS

Filed Dec. 27, 1965     3 Sheets-Sheet 3

INVENTOR.
Stephen L. Speranza, Jr.

United States Patent Office 3,371,895
Patented Mar. 5, 1968

3,371,895
VIBRATION-DAMPING AND LOAD-SUPPORTING APPARATUS
Stephen L. Speranza, Jr., Elmont, N.Y., assignor to Aeroflex Laboratories Incorporated, a corporation of Delaware
Filed Dec. 27, 1965, Ser. No. 516,434
7 Claims. (Cl. 248—20)

ABSTRACT OF THE DISCLOSURE

A vibration-damping and load-supporting apparatus for interconnecting a supporting member and a supported member comprises a box-like frame connected to one of the members and having in each of two parallel opposed faces a group of substantially equi-angularly spaced adjustable ferrules for anchoring opposed ends of a group of stranded wire cables extending between the opposed faces. An elongated strut is coaxially located in the frame and includes clamping means for securing an intermediate portion of each of the cables to the strut. The cable lengths, extending in opposite directions from the strut, are oppositely inclined at an acute angle to the axis of the apparatus and are prestressed approximately to the normal static load to be supported.

Background of the invention

This invention relates to vibration-damping and load-supporting apparatus and, while it is of general application, it is particularly suitable for supporting heavy rotating engines and machinery subject to vibration in normal operation.

Heretofore there have been developed various types of vibration-damping and load-supporting apparatus for different applications. One such prior apparatus designed and intended for supporting aircraft engines is described and claimed in Patent 3,204,897, issued Sept. 7, 1965, to Lawrence. The apparatus of that patent includes a circular array of substantially L-shaped stranded wire cable lengths extending between and rigidly secured to supporting and supported members. One arm of each of the cable lengths extends substantially radially and the other substantially axially so that vibrations of the supported load are absorbed primarily by bending of the cable lengths, acting as short cantilever beams.

While the apparatus described and claimed in aforesaid Patent 3,204,897 has been found entirely satisfactory in many applications, it presents design problems when the static and dynamic loads become very large.

It is an object of the invention, therefore, to provide a new and improved vibration-damping and load-supporting apparatus particularly suitable for supporting static and dynamic loads within a very large range of values.

It is another object of the invention to provide a new and improved vibration-damping and load-supporting apparatus having the following advantageous characteristics: a high spring rate in a relatively small volume; spring rates within a wide range of values which are linear throughout a wide range of loads, for example, spring rates of 5,000 to 500,000 pounds/inch; a spring rate which is approximately constant over a wide range of temperatures, for example from —100° F. to 1000° F.; and a spring rate which is readily adjusted for accommodating static and dynamic loads of widely different values.

Summary of the invention

In accordance with the invention, there is provided a vibration-damping and load-supporting apparatus for interconnecting a supporting member and a supported member comprising a frame for connection to one of the members having two groups of cable-attaching fittings lying approximately in spaced parallel planes, the fittings of each of the two groups being substantially equi-angularly spaced, a supporting element coaxial with the frame for connection to the other of the members having cable-attaching provisions in substantial angular alignment with both of the groups of cable-attaching fittings, and a plurality of substantially straight lengths of stranded wire cable extending between each of the fittings of the frame and corresponding cable-attaching provisions of the supporting element, the cable lengths extending between the supporting element and the fittings of the frame lying in one of the parallel planes being inclined at an acute angle to the common axis of the frame and the supporting element, and the cable lengths extending between the supporting element and the fittings of the frame lying in the other of the parallel planes being oppositely inclined at an acute angle to the common axis of the frame and the supporting element, such cable lengths being prestressed approximately to the normal static load to be supported, whereby a load applied by the supported member stresses the cable lengths preponderantly in tension or compression.

For a better understanding of the present invention, together with other and further objects thereof, reference is had to the following description, taken in connection with the accompanying drawings, while its scope will be pointed out in the appended claims.

Referring now to the drawings:

FIG. 4 is an end view, partly in section, of the apparatus of FIG. 3, while

Figure 1:
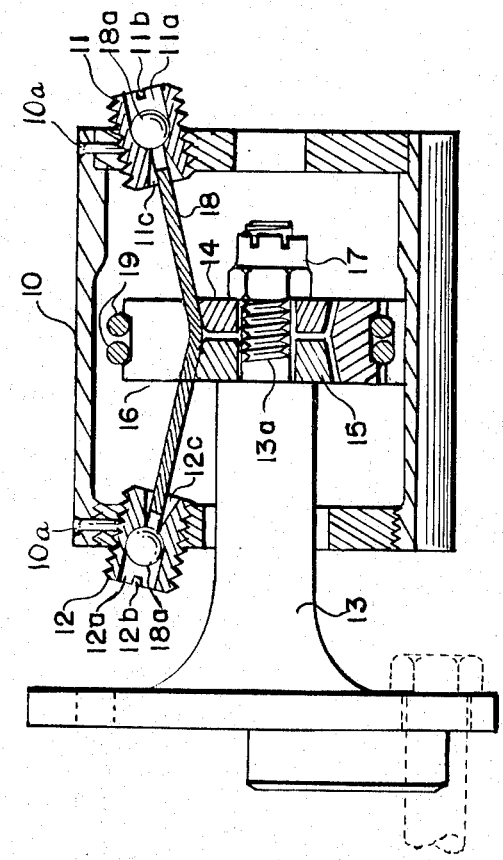
FIG. 1 is a longitudinal elevation, partly in section, of a vibration-damping and load-supporting apparatus embodying the invention.
Figure 2:
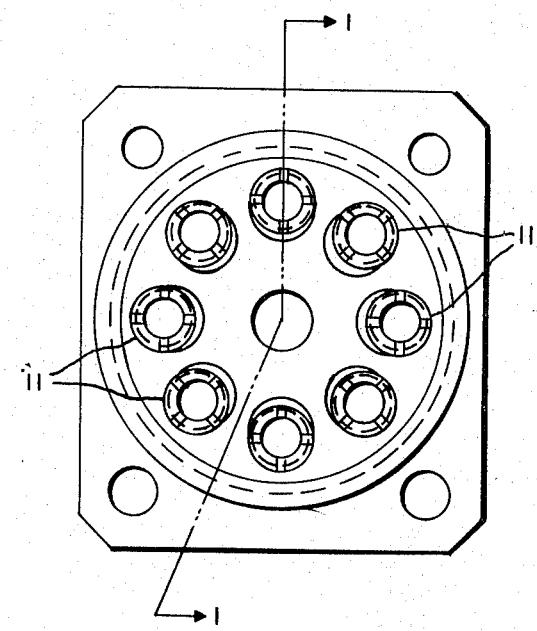
FIG. 2 is an end view of the apparatus of FIG. 1.

Referring now more particularly to FIGS. 1 and 2 of the drawings, there is illustrated a vibration-damping and load-supporting apparatus for interconnecting a supporting member and a supported member comprising a frame 10 in the form of a cylindrical box-like enclosure for connection to one of the members, for example an aircraft engine. The frame 10 has two groups of cable-attaching fittings 11 and 12 lying approximately in spaced parallel planes and the fittings of each of the groups being substantially equiangularly spaced about the central axis of the apparatus. Specifically, as shown, each group comprises eight cable fittings in a substantially circular array.

The apparatus of the invention further comprises a frame 13 in the form of an elongated rigid strut disposed centrally within the enclosure of the frame 10 and coaxial therewith for connection to the other of the members, for example the frame of an aircraft. The frame 13 is provided with cable-attaching means in substantially angular alignment with the groups of cable-attaching fittings 11, 12 of the frame 10, this cable-attaching means being disposed substantially midway between the two groups of fittings 11, 12. The cable-attaching provisions of the frame 13 may be in the form of two opposed frusto-conical annuli 14 and 15 surrounding a threaded extension 13a of the frame 13 and a surrounding annular clamping ring 16 having frusto-conical internal surfaces substantially complementary to the outer surfaces of the annuli 14, 15. A clamping nut 17 on the threaded extension 13a of stud 13 is effective securely to clamp cable lengths between the annuli 14, 15 on the one hand and the annulus 16 on the other hand.

The apparatus further comprises a plurality of substantially straight lengths of stranded wire cable 18, individually extending between the fittings 11, 12 of the frame 10 and the cable-attaching means 14, 15, 16 of the frame 13. While the cable lengths 18 are thus rigidly secured by the attaching provisions 14, 15, 16, the other end of each of the cables 18 is provided with a ball and shank terminal or ferrule 18a swaged to the end of the cable and fitted into a recess 11a or 12a, respectively, of the attaching fittings 11, 12. As shown, the attaching fittings 11, 12 are threaded into the ends of the frame 10 and include provisions, such as screwdriver slots 11b, 12b, to permit adjustment of the attaching fittings 11, 12, thereby to adjust the tension on each of the cables 18 individually. The fittings 11, 12 are prevented from rotational movements in their sockets in the frame 10 by dowel pins 10a, 10a. The inner end of each of the fittings 11, 12 is provided with a tapered recess, such as the recesses 11c, 12c, through which the cable lengths 18 extend. The arrangement described is such that the ends of the cable lengths 18 engaging the attaching fittings 11, 12, are universally and pivotally supported from the frame 10. Surrounding the annular ring 16 are resilient snubbing means such as a pair of rings 19 to absorb any impact between the clamping means of member 13 and the walls of the frame 10 during severe vibration. The rings 19 may be of stranded wire cable similar to the cable lengths 18.

While, in the construction shown in FIG. 1, the cable lengths are continuous through the clamping rings, they may be in the form of independent cable lengths on either side of the means for securing them to the strut 13.

As shown in FIG. 1, each of the cable lengths 18 is disposed at an acute angle to the common axes of the frames 10, 13 and the initial tensions on the cable lengths 18 are so adjusted that when a load is applied by the supported member, for example an aircraft engine, through the frame 10 so as to load the apparatus in any direction, the cable lengths 18 are stressed preponderantly in tension or compression, as contrasted to bending stresses in the apparatus described and claimed in aforesaid Patent 3,204,897.

Figure 3:
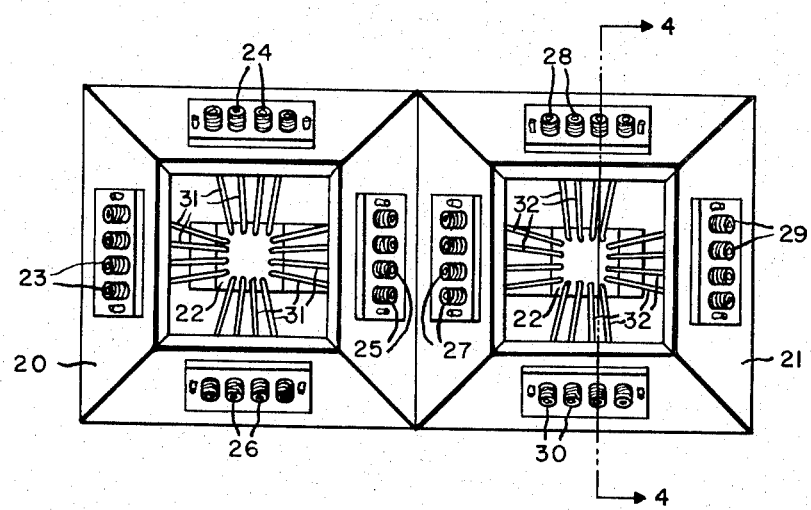
FIG. 3 is a top view of a vibration-damping and load-supporting apparatus embodying the invention in modified form.
Figure 4:
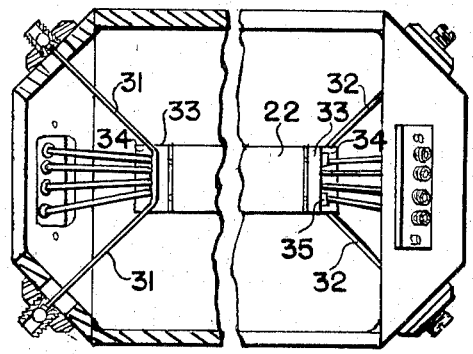
Figure 5:
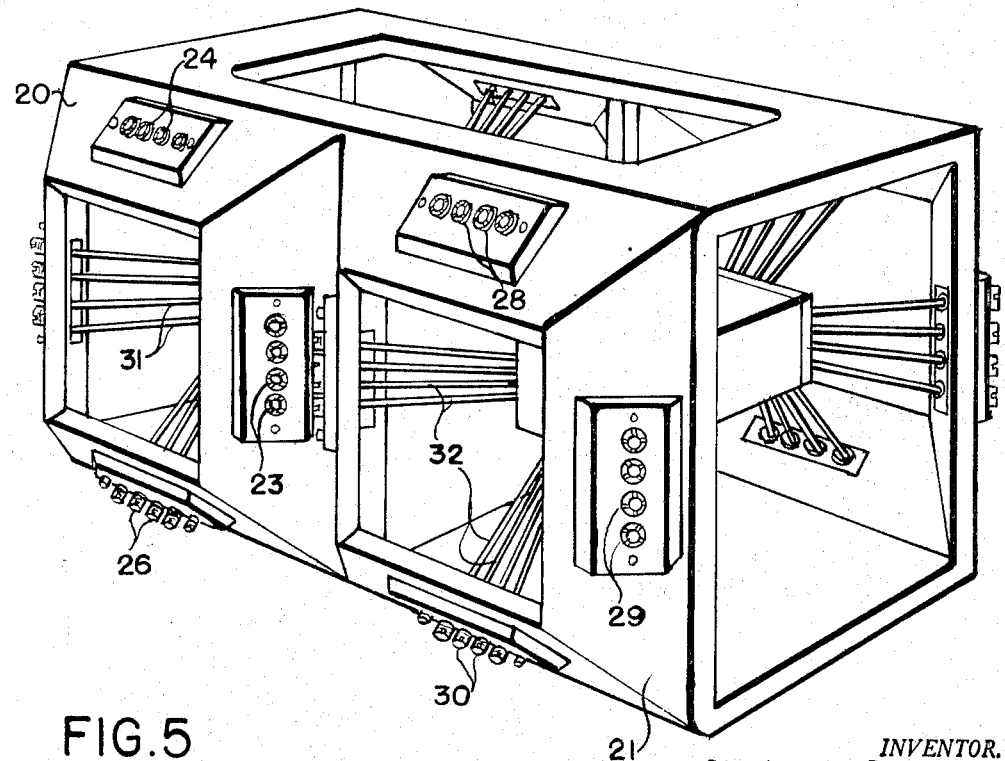
FIG. 5 is a perspective view of the apparatus shown in FIGS. 3 and 4.

A modified form of the vibration-damping and load-supporting apparatus embodying the invention is shown in FIGS. 3, 4, and 5 of the drawings which is designed and intended for use as a support or dolly for supporting machinery during vibration tests. In this form of the invention, the frame adapted to be connected to the supporting member, which may be the floor, is in the form of two approximately cubic enclosures 20 and 21 formed as an integral structure. Within the cubic enclosures 20 and 21 is disposed an elongated frame member 22 common to the two enclosures 20, 21 for connection to the supported member, for example to the base of the machine under test. In this construction, a plurality of groups of cable-attaching fittings are mounted in two opposed faces of each of the cubic frames 20 and 21. For example, referring to FIG. 3, four groups of cable-attaching fittings 23, 24, 25, and 26, which may be similar to the fittings 11, 12 of the apparatus of FIGS. 1 and 2, are disposed in the forward face of the cubic enclosure 20 and a like number are mounted in the rear face thereof (not shown).

Similarly, the groups of cable-attaching fittings 27, 28, 29, and 30 are mounted in the forward face of the cubic enclosure 21 and a like number of fittings are mounted in the rear face thereof (not shown). Stranded wire cable lengths 31 extend from the groups of fittings 23, 24, 25, and 26 on the forward face of the cubic frame member 20 to corresponding fittings on the back face thereof and are suitably clamped at their centers to the frame member 22.

Similarly, a series of stranded wire cable lengths 32 extend from the groups of attaching fittings 27, 28, 29, and 30 on the forward face of the cubic frame member 21 to corresponding fittings on the rear face thereof. The opposing faces of the cubic enclosures 20, 21 are preferably sloped outwardly, as shown, in order that the forces applied thereto by the cable lengths and their respective fittings may be approximately normal to such faces, as shown in FIG. 4, increasing the strength and rigidity of the frame 20, 21.

As shown more clearly in FIG. 4, the cable lengths 31 and 32 form an acute angle to the transverse axis of the frame enclosure 21, connected to the supporting member. As shown in FIG. 4, each of the groups of cables 31 or 32 is attached to the frame 22 by means of a pair of clamping plates 33 and 34, preferably grooved to receive the cable lengths, and secured to the frame 22 in any suitable fashion, as by machine screws 35.

Thus, in the apparatus of FIGS. 3 and 4, as in the apparatus of FIGS. 1 and 2, the angular orientation of the cable lengths 31 and 32 and the prestresses applied to them are such that a load applied to the frame 22 from the supported member in any direction stresses the cable lengths preponderantly in tension or compression.

It will be apparent that the vibration-damping and load-supporting apparatus of both modifications of applicant's invention are characterized by a number of advantageous performance characteristics, among which may be mentioned:

An extremely high spring rate for a given overall volume.

The stress on the cable lengths is preponderantly by extension and contraction within the elastic limits of the cables, as contrasted to stress primarily by bending in prior apparatus of this type. While there is a slight bending of the cables under load adjacent their attachment to the central frame, such bending is limited to an insignificant value by the limited elongation of the cables under tension.

The cable lengths are prestressed, normally approximately equal to the stress from a static load for which the apparatus is designed, in order to minimize bending or buckling of the lower cable lengths acting as columns. While the lower cables may buckle as the prestress load is exceeded, they offer no load support at this point and complete load transfer to the upper cables results. This is a gradual transfer with no abrupt performance change.

The universal support of the ends of the cable lengths in the fittings minimizes bending at that point of support.

Vibrations and shocks are damped by interstrand friction resulting from the twisting and untwisting of the cable lengths which is facilitated by the universal support at one end.

The angle of the cable lengths to the axis of the apparatus is determined by the ratio of the desired axial to radial stiffness. This angle to the axis may be expressed as a function of $$\tan^{-1} \frac{\text{expected maximum radial load}}{\text{expected maximum axial load}}$$

The spring rate of the apparatus is substantially linear throughout the load range within the elastic limits of the cable lengths for loads applied at the center. Nonlinear effects are attainable by eccentric loading.

Apparatus utilizing the designs described have realized spring rates of 100,000 to 500,000 pounds/inch.

The spring rate deviates less than 10% from its nominal value throughout a temperature range of $-100°$ F. to $1000°$ F.

The spring rate is adjustable by adjusting the threaded ferrules.

The swaged ferrules are capable of withstanding the full breaking strength of the cables.

The test facility support of FIGS. 3, 4, and 5 may be designed accurately to simulate the expected foundation stiffness for machinery subject to vibration. Such apparatus enables the performance of the machinery to be tested on a support simulating its actual support.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A vibration-damping and load-supporting apparatus for interconnecting a supporting member and a supported member comprising:

a frame for connection to one of said members having two groups of cable-attaching fittings lying approximately in spaced parallel planes, the fittings of each of said groups being substantially equiangularly spaced;

a supporting element coaxial with said frame for connection to the other of said members having cable-attaching provisions in substantial angular alignment with both of said groups of cable-attaching fittings;

and a plurality of substantially straight lengths of stranded wire cable extending between each of said fittings of said frame and corresponding cable-attaching provisions of said supporting element, the cable lengths extending between said supporting element and the fittings of said frame lying in one of said planes being inclined at an acute angle to the common axis of said frame and said supporting element, and the cable lengths extending between said supporting element and the fittings of said frame lying in the other of said planes being oppositely inclined at an acute angle to the common axis of said frame and said supporting element, said cable lengths being prestressed approximately to the normal static load to be supported, whereby a load applied by said supported member stresses said cable lengths preponderantly in tension or compression.

2. A vibration-damping and load-supporting apparatus in accordance with claim 1 in which said frame is in the form of a box-like enclosure and said supporting element is in the form of an elongated rigid strut disposed centrally within said enclosure.

3. A vibration-damping and load-supporting apparatus in accordance with claim 1 in which said supporting element is disposed substantially midway between the two groups of fittings of said frame.

4. A vibration-damping and load-supporting apparatus in accordance with claim 1 which includes means for universally coupling one corresponding end of each of said cable lengths to its respective fitting.

5. A vibration-damping and load-supporting apparatus in accordance with claim 1 in which each of the fittings associated with said frame includes adjustable means for adjusting the tension of its respective cable length.

6. A vibration-damping and load-supporting apparatus in accordance with claim 2 including a central annular ring surrounding said cable lengths and securing them to said supporting element.

7. A vibration-damping and load-supporting apparatus in accordance with claim 6 including resilient snubbing means surrounding said clamping ring for absorbing impact between said ring and said frame.

References Cited
UNITED STATES PATENTS

| | | |
|---|---|---|
| 3,086,600 | 4/1963 | Kerley. |
| 3,204,897 | 9/1965 | Lawrence _____ 248—5 |
| 3,204,913 | 9/1965 | Lawrence _____ 248—358 |

JOHN PETO, *Primary Examiner.*